United States Patent [19]

Gargini

[11] 4,013,963
[45] Mar. 22, 1977

[54] WIRED BROADCASTING SYSTEMS
[75] Inventor: Eric John Gargini, West Drayton, England
[73] Assignee: Communications Patents Limited, London, England
[22] Filed: Aug. 6, 1975
[21] Appl. No.: 602,534
[30] Foreign Application Priority Data
Aug. 6, 1974 United Kingdom ............ 34512/74
[52] U.S. Cl. .......................... 325/308; 178/DIG. 13
[51] Int. Cl.² ...................... H04N 1/44; H04N 7/10
[58] Field of Search ...................... 178/DIG. 3, 5.1; 325/308, 309

[56] References Cited
UNITED STATES PATENTS

| | | | |
|---|---|---|---|
| 3,566,020 | 2/1971 | Kinross | 178/DIG. 13 |
| 3,594,496 | 7/1971 | Parton | 325/308 |
| 3,790,700 | 2/1974 | Callais | 325/308 |
| 3,801,735 | 4/1974 | Gabriel | 178/DIG. 13 |
| 3,886,302 | 5/1975 | Kosco | 178/DIG. 13 |
| 3,911,204 | 10/1975 | Spinelli | 178/DIG. 13 |
| 3,914,534 | 10/1975 | Forbes | 178/5.1 |

Primary Examiner—Robert L. Griffin
Assistant Examiner—Michael A. Masinick
Attorney, Agent, or Firm—Laurence R. Brown

[57] ABSTRACT

A wired broadcasting system is disclosed in which a plurality of subscriber units are connected to a program exchange at which a plurality of program signals are made available by respective cables. A program selector is provided in respect of each subscriber unit and the subscriber unit is able to control the respective selector. At least one secondary program signal source is provided at the exchange and at least one subscriber unit is provided with control means for controlling the application of program signals from the secondary program source to the respective cable.

4 Claims, 5 Drawing Figures

WIRED BROADCASTING SYSTEMS

The present invention relates to wired broadcasting systems, and in particular to systems in which a plurality of program signals are made available at an exchange for broadcasting to subscribers, each subscriber being equipped with means for controlling a respective selector at the exchange to select desired program signals.

In known systems, for example that described in our British patent specification No. 1,272,594, the subscriber can select any one of 36 program by controlling a 36 position selector. It may be desired to provide more than 36 possible selections, for example in educational systems such as may be installed in a university, and in communal information systems where access to many sets of information may be required, for example airports and stock exchanges. In such circumstances, it has been proposed to connect a second selector to the 36 terminal of the first selector to provide a total of 71 possible selections. Further additions could be made to the second selector, providing the posibility of 106, and 141 selections for example. In systems in which the selectors are controlled by D.C. dialling as used in conventional telephone systems, the selectors can only be stepped by a maximum of ten positions at any one time, and the dialling process when a number of selectors are provided can be very tedious.

According to the present invention, there is provided a wired broadcasting system comprising a program exchange at which a plurality of program signals are made available, a plurality of subscriber units connected to the exchange by respective cables so as to receive program signals selected by respective program selectors located at the exchange, and means located at each subscriber unit for controlling the respective program selectors, wherein at least one secondary program signal source is provided at the exchange, and at least one subscriber unit is provided with control means for controlling the application of program signals from the secondary program source to the respective cable.

A further plurality of program signals may be made available at the said secondary program signal source and the control means may be arranged to control a further program selector located at the exchange and arranged to apply a selected one of the further plurality of program signals to a terminal of the program respective to the said at least one subscriber unit. A plurality of further program selectors may be provided, the further program selectors being connected either in parallel to respective terminals of the said respective program selector or in series to a terminal thereof.

Alternatively, a further plurality of program signals may be made available at the secondary program signal source, and the control means may be arranged to control the connection of the subscriber units respective cable directly to a further program signal selector connected to the secondary program signal source.

As a further alternative, the secondary program signal source may comprise a video recorder the functioning of which may be controlled by the said control means. The video recorder may be connected to a terminal of the said respective program selector.

The control means may comprise means for providing D.C. control signals or audio tone control signals, tuned circuits being provided to convert the tones to D.C. control signals.

Embodiments of the present invention will now be described, by way of example, with reference to the accompanying drawings.

Figure 1:
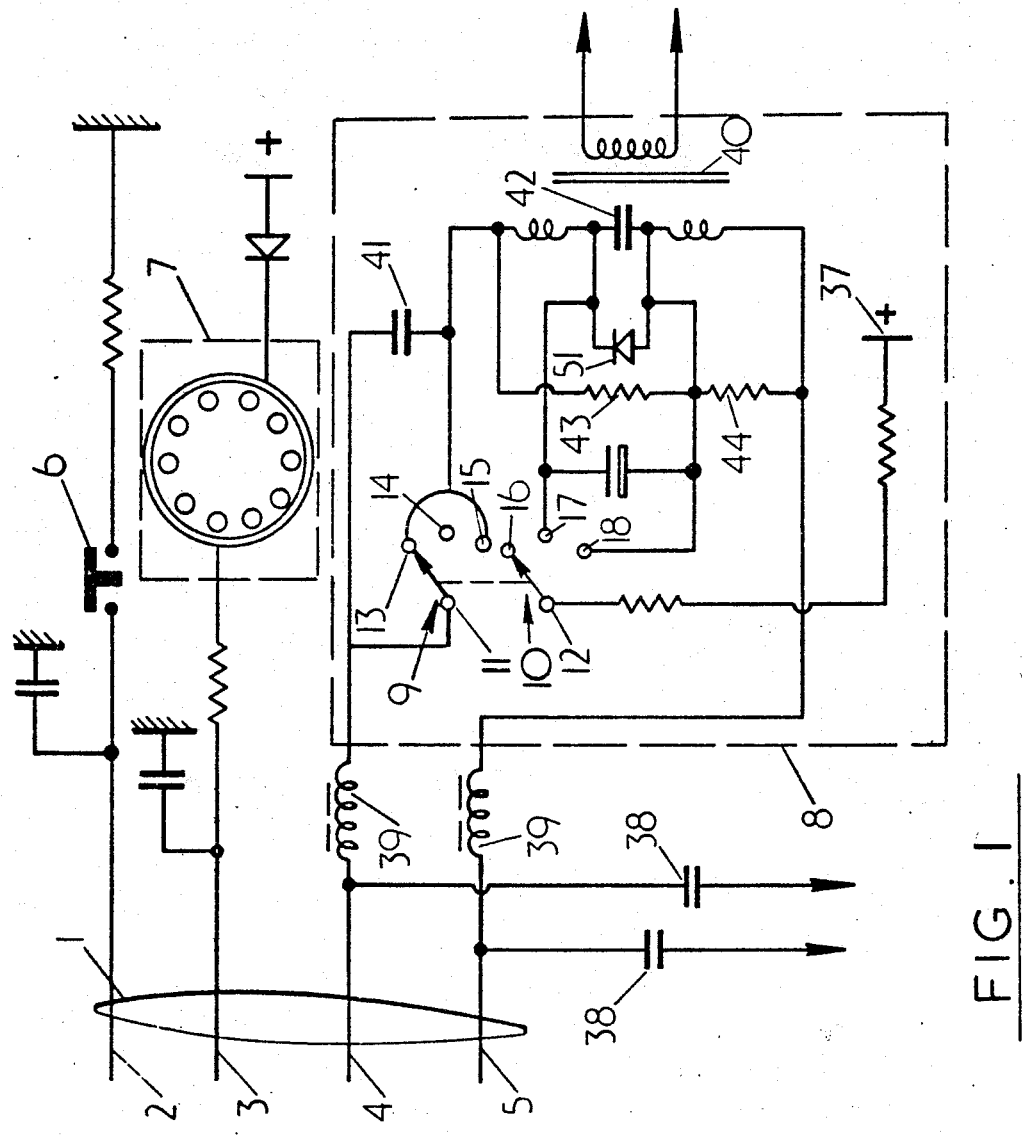
FIG. 1 is a schematic circuit diagram of a subscriber's program selection unit.
Figure 2:
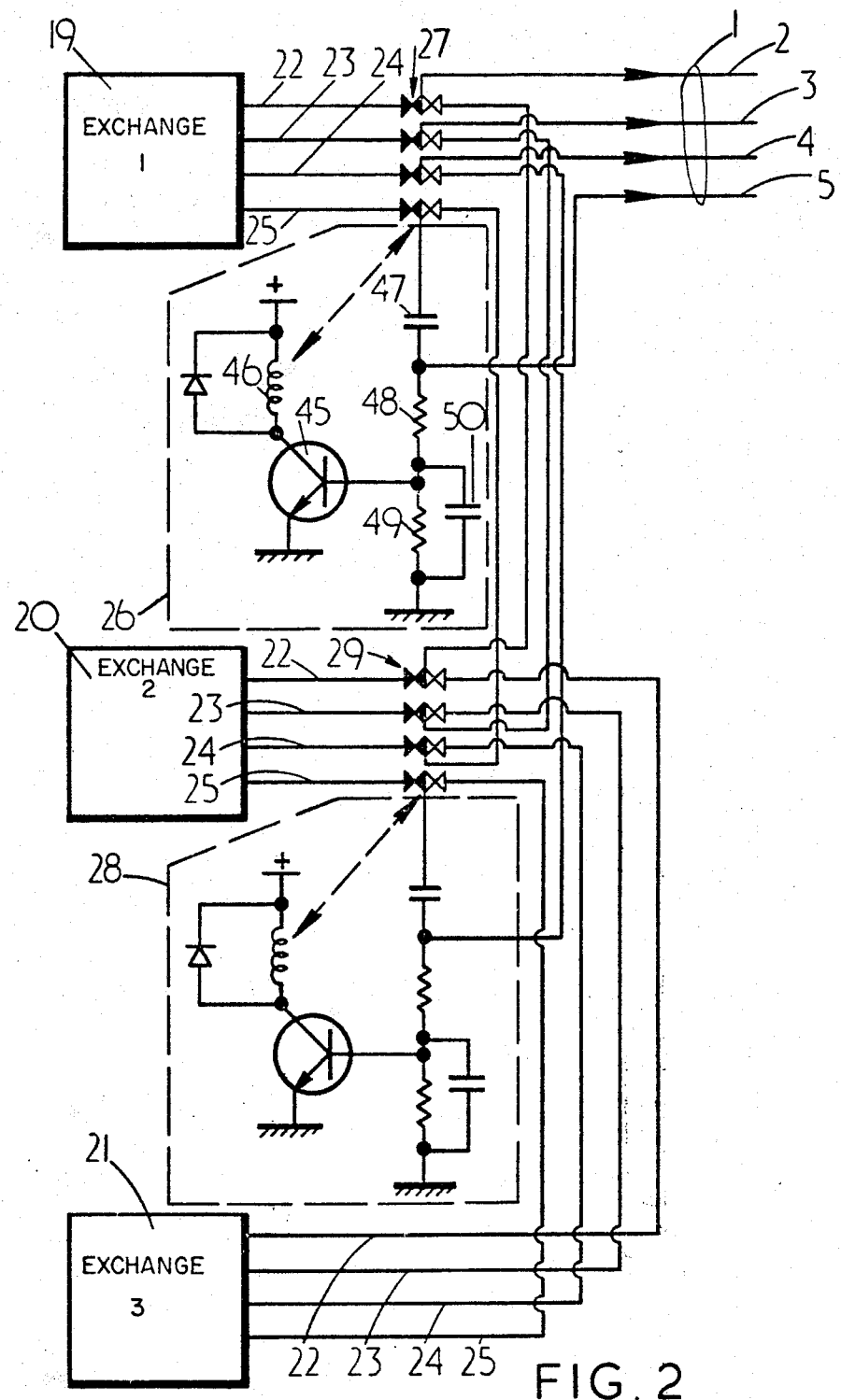
FIG. 2 is a schematic circuit diagram of a central program exchange installation to which the subscriber unit of FIG. 1 is connected.

Referring to FIGS. 1 and 2, the subscriber unit of FIG. 1 is connected to the exchange installation of FIG. 2 by a four wire cable 1 comprising lines 2, 3, 4 and 5. The subscriber unit is provided with a reset button 6 depression of which connects line 2 to ground and a dial unit 7 manipulation of which applies positive pulses to line 3 in a manner well known from conventional telephone dialling systems. The responses of the exchange installation to actuation of the button 6 and dial 7 will be described hereinafter with reference to FIG. 3.

The subscriber unit is also provided with an exchange selection unit 8 comprising ganged switches 9 and 10 arranged to connect terminals 11 and 12, to terminals 13, 14 or 15 and 16, 17 or 18 respectively.

The exchange installation is provided with three program exchanges 19, 20 and 21 at each of which 36 programs are available for selection and application to output cables comprising lines 22, 23, 24 and 25 respectively, the selection being controlled by the reset button 6 and dial unit 7. A number of subscribers will be connected to the exchange installation so as to be able to select each of the programs for application to their respective cable, but the provisions made for one subscriber only will be described.

The exchange installation comprises a change over unit 26 which controls contacts 27 to switch between exchanges 19 and 20, and a change over unit 28 which controls contacts 29 to switch between exchanges 20 and 21.

Figure 3:
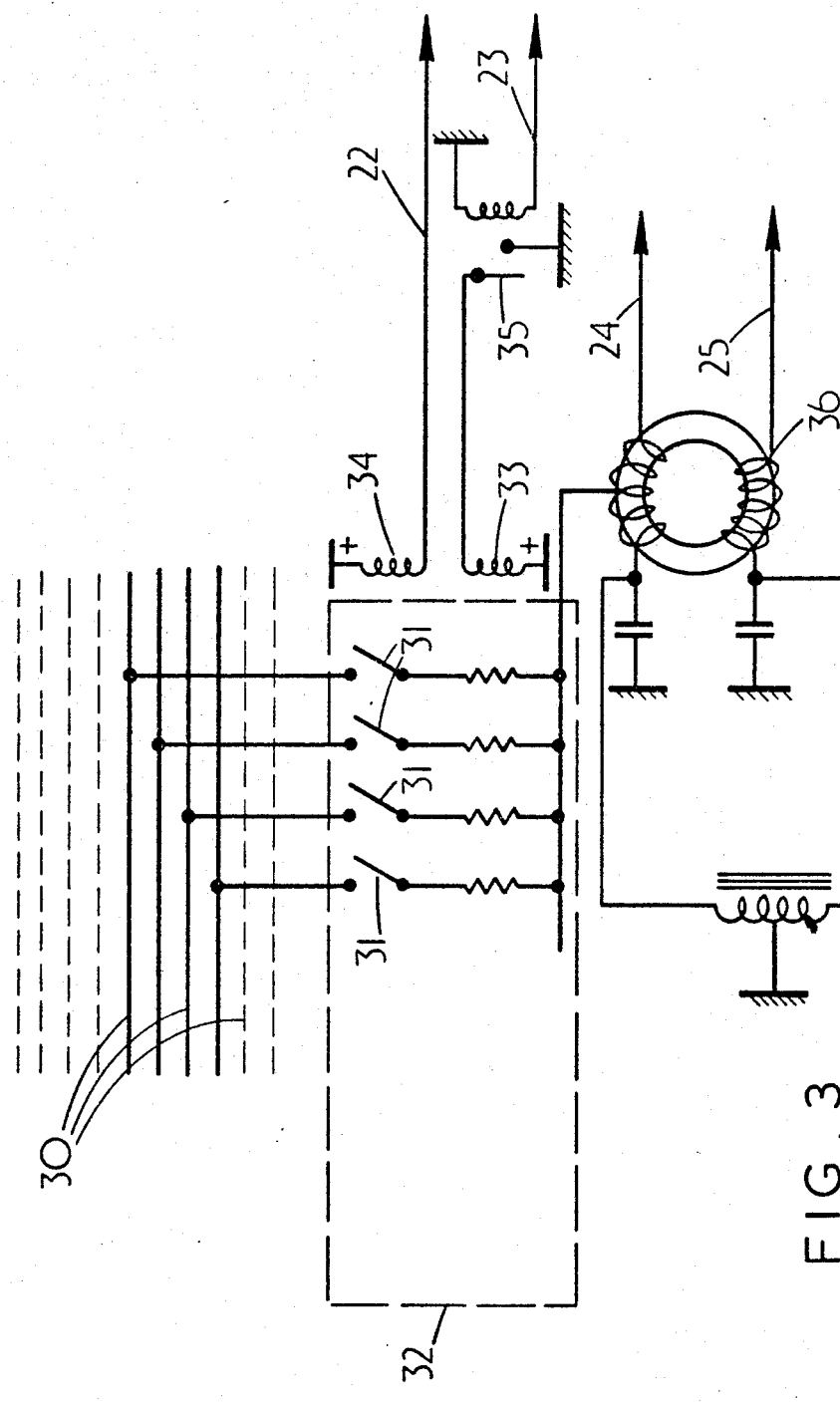
FIG. 3 is a schematic circuit diagram of a program exchange forming a component part of the installation illustrated in FIG. 2.

Referring to FIG. 3, details of an exchange such as exchange 19, 20 or 21 are illustrated. Different program signals are made available on each of 36 lines 30, only some of which are shown to simplify the figure, and applied to a series of 36 respective switches 31 provided in a selector 32. The selector 32 is operated in a manner known from telephone systems by a stepping coil 33 and a reset coil 34, the stepping coil 33 being energized to sequentially close the switches 31 by a relay 35 in response to D.C. pulses applied to the line 23 (See FIG. 2) and the reset coil 34 being energized to return the switches 31 to a datum position in response to the connection of line 22 to ground. The program selected by the switches 31, which program signal comprises a high frequency vision signal and an audio frequency sound signal, is applied to lines 24 and 25 via a balun 36, the lines 22, 23, 24 and 25 being arranged as shown in FIG. 2 for connection to the lines 2, 3, 4 and 5 connected to the subscriber unit.

The operation of the described system will now be described. If the subscriber wishes to receive a program made available at exchange 19, the ganged switches 9 and 10 (FIG. 1) are arranged as shown. As a result of the terminal 16 being isolated, no current is drawn from a source of potential 37. The H.F. vision signal is passed via audio hold off capacitors 38 to a receiver (not shown), and the audio sound signal is passed via HF chokes 39 to an audio output transformer 40 directly from line 5 and through switch 9 from line 4. The change over units 26 and 28 are inoperative, and the contacts 27 connect the exchange 19 to the lines 2, 3, 4, 5. The subscriber then operates the dial unit 7 to select the desired one of the program made available at the selected exchange 19.

If the subscriber wishes to receive a program made available at the exchange 20, the ganged switches 9 and 10 are operated to connect terminals 11 and 14 and to connect terminals 12 and 17. The terminal 14 is isolated, but an audio bypass capacitor 41 passes the audio signals to the output transformer 40. The transformer is also provided with an audio bypass capacitor 42. The connection of terminals 12 and 17 enable the flow of current from the potential source 37 via transformer 40 and resistors 43 and 44 to the line 5. The line 5 is connected at the exchange installation to the change over unit 26 which comprises a transistor 45, and the current drawn turns on the transistor 45 to energize a coil 46 which causes the contacts 27 to switch. The change over unit 26 also comprises a bypass capacitor 47 for passing program signals to the line 5 from the exchange, and a high ohmic value resistor 48, a lower ohmic value resistor 49, and a decoupling capacitor 50 in parallel with the resistor 49 for providing suitable bias to the transistor 45.

When the contacts 27 are switched, the lines 2, 3, and 5 are connected to the lines 22, 23, and 24 of exchange 20, the line 4 being connected to the change over unit 28. The change over units 26 and 28 are substantially identical, and thus a bypass capacitor corresponding to capacitor 47 of unit 26 connects the line 4 to the line 25 of the exchange 20. It will be noted that the connections at exchange 20 between the lines 4 and 5 and the lines 24 and 25 are reversed relative to the corresponding connections at exchange 19. Once the lines 2, 3, 4 and 5 are connected to the exchange 20, the subscriber can again select the single program desired using the dial unit 7.

If the subscriber wishes to receive a program made available at the exchange 21, the ganged switches 9 and 10 are operated again to connect terminals 11 and 15 and terminals 12 and 18. The current flowing through line 5 is maintained via diode 51 (FIG. 1) so that the change over unit 26 maintains the contacts 27 in their switched condition. Furthermore, current is drawn through line 4 via switch 9 to energize the change over unit 28, the current causing the transistor of the change over unit 28 which corresponds to transistor 45 to turn on and switch contacts 29. This connects the lines 2, 3, 4 and 5 to the exchange 21 and individual program selection can then be performed using the dial unit 7.

The embodiment of FIGS. 1 to 3 provides for any one of a total of 36 + 36 + 36 = 108 program to be received.

Figure 4:
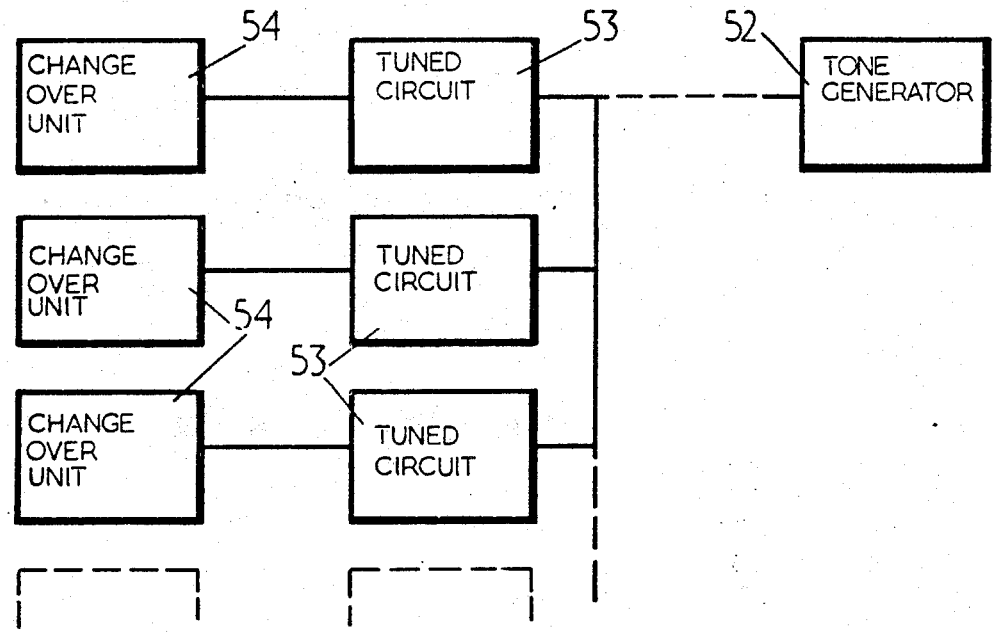
FIG. 4 is a schematic diagram of an alternative program selection means to that of the embodiment of FIGS. 1 to 3.

Referring to FIG. 4, an alternative to the D.C. exchange selection system of the previously described embodiment will be described. The exchange selection unit 8 of FIG. 1 is replaced by a tone generator 52 located at the subscriber unit and provided with push buttons (not shown) the depression of any one of which applies a characteristic tone respective thereto to the cable 1. The frequency of the tones advantageously lies within the range of 30 KHz to 500 KHz. The tones are applied at the exchange installation to tuned circuits 53 which are adapted to identify respective ones of the characteristic tones and to control change over units 54 to select an exchange in accordance with the identified tone. The change over units 54 may be similar to the change over unit 26 of FIG. 2, one of the tuned circuits being connected in the base circuit of a transistor corresponding to the transistor 45 in each change over unit 54. It will be appreciated that the tone generator 52 may be used to provide a large number of different tones each of which can control a respective change over unit 54. Very large numbers of different program may thus be handled.

Figure 5:
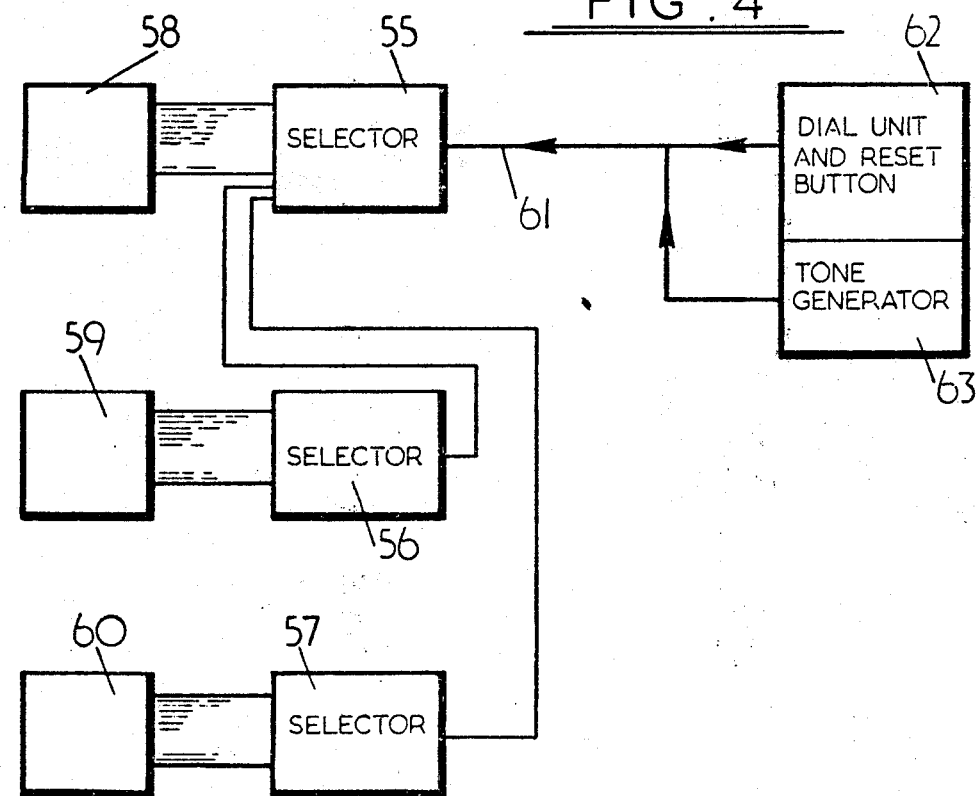
FIG. 5 is a schematic diagram of a further embodiment of the invention.

Referring now to FIG. 5, an embodiment will be described in which a subscriber is provided at a central exchange installation with a first 36 position selector 55 of the standard D.C. actuated type such as has been described with respect to FIG. 3. Two of the terminals of the first selector 55 are connected to respective secondary 36 position selectors 56 and 57, the other 34 terminals being connected to a source 58 of 34 program signals and the terminals of the selectors 56 and 57 being connected to sources 59 and 60 of 36 programs each. This arrangement makes 36 + 36 + 34 = 106 selections possible. Each selector 55, 56, 57 has a "dial" solenoid (not shown) arranged when energized to actuate the selector, and a "reset" solenoid (not shown) arranged when energized to return the selector to a datum position, as in the arrangement of FIG. 3. The solenoids are all connected to a control pair of a cable 61 extending to the respective subscriber, the solenoids of the first selector being connected to the cable 61 via respective rectifier devices (not shown) of opposed polarities and the solenoids of the secondary selectors being connected via respective tuned rectifier devices (not shown).

The subscriber is provided with equipment 62 including a standard D.C. pulse-producing dial and a reset button such as are shown in FIG. 1, and an audio tone generator 63, all connected to the said control pair. The subscriber may manipulate the dial unit to provide D.C. pulses of one polarity to control the first selector 55, or may press the reset button to apply a D.C. voltage of the other polarity to reset the first selector to a datum position. The secondary selectors 56, 57 may be controlled by the tone generator 63 which is provided with ten buttons for applying respectively from one to 10 pulses of a first audio tone to the control pair of the cable 61 and a button for applying a second reset tone. The tuned rectifier devices of the "dial" solenoids convert the first tone to an energizing D.C. voltage and suppress the second tone whereas the tuned rectifier of the "reset" solenoid converts the second tone to an energizing D.C. voltage and suppress the first tone.

When a subscriber wishes to select a program made available from one of the two program sources 59, 60, the dial unit 62 is manipulated to select the desired terminal of the first selector 55 and the tone generator 63 is used to select the desired terminal of the secondary selector 56 or 57. It will be appreciated that both the secondary selectors 56, 57 are controlled together.

When a subscriber wishes to select a program made available from the program source 58, the dial unit alone is used to select the desired terminal.

It will be appreciated that if each terminal of the first selector 55 were connected to a respective secondary selector, a total of 36 × 36 possible program selections could be accommodated.

In the embodiment of FIG. 5, the secondary selectors 56, 57 are arranged in parallel, but they could be arranged in series if desired by connecting one of the secondary selectors to the other rather than to the first selector. This would necessitate the use of four tones rather than two as the secondary selectors would have to be independently controllable.

The secondary selectors 56, 57 may be replaced by educational video records (EVR's). Thus a subscriber can select one of two EVR's, or one of 34 other program from the source 58.

In such arrangement the tone generator 63 is adapted to provide three tones for application to the control pair of the cable 61. Each EVR has stop, start and rewind controls connected to the control pair and actuable by respective ones of the three tones. The subscriber can thus exercise full control over the functioning of each EVR.

It will be appreciated that an embodiment of the invention can be provided in which the first selector 55 has different terminals connected to secondary selectors and EVR's if a sufficient number of tones can be generated to control both.

The described embodiments provide systems in which a selection can be made from a large number of alternative programs without tedious dialling operations.

The present invention may be used to provide a communal information service, for example to airports or stock exchanges. Each program source could comprise a read out head associated with a Digi-TV or Divcon machine in which a multi track magnetic drum or disc carries on each track a recording of one television picture frame which can thus be viewed for as long as required. Such machines are normally associated with a computer which stores in its memory a large amount of information. The subscriber is provided with controls for transferring selected parts of the information stored in the computer to one of the magnetic tracks of the machine from which it can be studied as required. The computer controls may be actuated by tones in a manner similar to that described above in respect of EVR machines.

Control of a mathematical computer could be effected in a similar manner by utilizing at the subscriber's installation a keyboard and tone generating unit. The alpha-numeric output from the computer would be displayed via a Digi-TV or Divcon machine on the subscribers television receiver.

If any of the information is to be provided for the use of one or a small group of subscribers, a "dedicated" program output can be provided at the program exchange as described in our copending British patent application No. 46966/72.

What is claimed is:

1. A wired broadcasting system comprising a program exchange, three program sources each presenting a plurality of video program signals at said exchange, three program selectors at said exchange each connected to a respective said source, a plurality of subscriber units connected to the exchange by respective cables to receive program signals from the respective program selectors, means located at each subscriber unit for controlling the respective program selectors connected to the program exchange by a two pair cable and provided with a first d-c control signal generating means for applying d-c program selector control signals to one of the pairs and a second control signal generating means for applying a second control signal to the other pair to control the connection of one of the program selectors to said cable, and two change over units controllable by said second control signal generating means, a first said change over unit constructed to disconnect a first said selector from said cable and to connect a second said selector thereto and the second said change over unit constructed to disconnect said second selector from said cable and to connect the third selector thereto.

2. A wired broadcasting system according to claim 1, wherein the second control signal generating means comprises a tone generator which may be actuated to apply any of a plurality of tone control signals to the said other pair, tuned circuits are connected at said exchange for detecting respective ones of said tone control signals, and connecting means is provided responsive to the detected tone to connect said cable to different ones of said program selectors wherein the connecting means comprises a plurality of transistors with base circuits each of which is connected to energize a relay to change a respective set of contacts, the respective tuned circuits being connected in the base circuits of the transistors to respond to respective ones of said tone control signals.

3. A wired broadcasting system according to claim 1, wherein the second control signal generating means comprises a three-position switch, the switch arranged when in a first position to draw no current through the said other pair, when in a second position to draw current through one conductor of the said other pair to actuate the first change over unit, and when in the third position to draw current through both the conductors of the said other pair to maintain actuation of the first change over unit and to actuate the second change over unit.

4. A wired broadcasting system according to claim 3, wherein each change over unit comprises a relay with a set of contacts and a transistor circuit constructed to energize said relay to change said set of contacts, a bias circuit for said transistor circuit connected to one of the conductors of the said other pair so that when current is drawn through that conductor the relay contacts are changed.

* * * * *